(12) United States Patent
Kim et al.

(10) Patent No.: US 8,174,390 B2
(45) Date of Patent: May 8, 2012

(54) RADIO FREQUENCY IDENTIFICATION TAG AND ANTENNA FOR RADIO FREQUENCY IDENTIFICATION TAG

(75) Inventors: Jeong Seok Kim, Daejeon (KR); Won Kyu Choi, Daejeon (KR); Gil Young Choi, Daejeon (KR); Cheol Sig Pyo, Deajeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 959 days.

(21) Appl. No.: 12/176,757

(22) Filed: Jul. 21, 2008

(65) Prior Publication Data

US 2009/0146820 A1    Jun. 11, 2009

(30) Foreign Application Priority Data

Dec. 6, 2007   (KR) .................. 10-2007-0126292
Mar. 11, 2008  (KR) .................. 10-2008-0022615

(51) Int. Cl.
*G08B 13/14* (2006.01)
(52) U.S. Cl. ............................. 340/572.7; 343/700 MS
(58) Field of Classification Search ............... 340/572.7, 340/500, 540, 568.1, 572.1; 343/850, 852, 343/857, 860, 862
See application file for complete search history.

(56) References Cited

U.S. PATENT DOCUMENTS

| | | | |
|---|---|---|---|
| 6,028,564 A | 2/2000 | Duan et al. | |
| 6,215,402 B1 | 4/2001 | Rao Kodukula et al. | |
| 6,285,342 B1 | 9/2001 | Brady et al. | |
| 6,353,443 B1 | 3/2002 | Ying | |
| 6,535,175 B2 | 3/2003 | Brady et al. | |
| 7,004,399 B2 | 2/2006 | Maeda et al. | |
| 7,557,757 B2 * | 7/2009 | Deavours et al. | 343/700 MS |
| 8,068,057 B2 * | 11/2011 | Yamagajo et al. | 343/700 MS |

FOREIGN PATENT DOCUMENTS

JP    2003-087044 A    3/2003
(Continued)

OTHER PUBLICATIONS

Sung-Joo Kim; Byongkil Yu; Ho-Jun Lee; Myun-Joo Park; Harackiewicz, F.J.; Byungje Lee; , "RFID tag antenna mountable on metallic plates," Microwave Conference Proceedings, 2005. APMC 2005. Asia-Pacific Conference Proceedings , vol. 4, no., pp. 3 pp., Dec. 4-7, 2005 doi: 10.1109/APMC.2005.1606887.*

(Continued)

*Primary Examiner* — Brian Zimmerman
*Assistant Examiner* — Sara Samson
(74) *Attorney, Agent, or Firm* — Kile Park Goekjian Reed & McManus PLLC

(57) ABSTRACT

An RFID tag attached to an object and transmitting a signal that corresponds to identification information includes an RFID tag chip that modulates the signal according to the identification information and an RFID tag antenna that transmits the modulated signal. The RFID tag antenna includes a dielectric material, a radiating patch, and a slit. The dielectric material has a polyhedral shape and includes a first surface that contacts the object and a second surface that is parallel with the first surface, the radiating patch is formed on at least a part of the second surface and radiates electromagnetic to waves, and the slit is formed on at least a part of the radiating patch to expose the dielectric material.

17 Claims, 5 Drawing Sheets

FOREIGN PATENT DOCUMENTS

| | | |
|---|---|---|
| JP | 2004-112020 A | 4/2004 |
| KR | 1020010053422 A | 6/2001 |
| KR | 100705359 B1 | 4/2007 |

OTHER PUBLICATIONS

Byunggil Yu; Sung-Joo Kim; Byungwoon Jung; Harackiewicz, F.J.; Myun-Joo Park; Byungje Lee; , "Balanced RFID Tag Antenna Mountable on Metallic Plates," Antennas and Propagation Society International Symposium 2006, IEEE, vol., no., pp. 3237-3240, Jul. 9-14, 2006 doi: 10.1109/APS.2006.1711301.*

Byunggil Yu, et al., "RFID Tag Antenna Using Two-Shorted Microstrip Patches Mountable on Metallic Objects", Microwave and Optical Technology Letters, Feb. 2007, pp. 414-416, vol. 49, No. 2.

* cited by examiner

RADIO FREQUENCY IDENTIFICATION TAG AND ANTENNA FOR RADIO FREQUENCY IDENTIFICATION TAG

CROSS-REFERENCE TO RELATED APPLICATION

This application claims priority to and the benefit of Korean Patent Application Nos. 10-2007-0126292 and 10-2008-0022615 filed in the Korean Intellectual Property Office on Dec. 6, 2007 and Mar. 11, 2008, the entire contents of which are incorporated herein by reference.

BACKGROUND OF THE INVENTION (a) Field of the Invention

The present invention relates to a radio frequency identification tag antenna.

The present invention was supported by the IT R&D program of is MIC/IITA [2006-S-023-02, Development of Advanced RFID System Technology].

(b) Description of the Related Art

A radio frequency identification (RFID) tag is used in various fields such as distribution and material handling industries, together with an RFID reader.

When an object to which the RFID tag is attached accesses a read zone of the RFID reader, the RFID reader generates an interrogation signal by modulating an RF signal having a specific frequency, the RFID reader transmits the interrogation signal to the RFID tag, and the RFID tag responds to the interrogation received from the RFID reader.

That is, the RFID reader transmits an interrogation signal to the RFID tag by modulating a continuous electromagnetic wave having a specific frequency. The RFID tag transmits back the electromagnetic wave transmitted from the RFID reader after performing back-scattering modulation in order to transmit its own information stored in the RFID tag's internal memory. The back-scattering modulation is a method for transmitting tag information by modulating the amplitude and/or the phase of a scattered electromagnetic wave when the RFID tag transmits the electromagnetic wave that is initially transmitted from the RFID reader back to the RFID reader by scattering the electromagnetic wave.

A typical passive RFID tag includes an RFID tag chip and an RFID tag antenna. At this time, the RFID tag antenna further includes a feeding line with a loop shape, which supplies power to the RFID tag chip. Since a passive RFID tag does not include a separate operation power source, it rectifies the electromagnetic wave transmitted from the RFID reader and uses the rectified electromagnetic wave as its own power source to acquire operation power. That is, the RFID tag chip modulates the amplitude and/or the phase of the electromagnetic waves received from the RFID reader in accordance with identification information, and the RFID tag antenna scatters the electromagnetic waves modulated by the RFID tag chip.

The intensity of the electromagnetic wave transmitted from the RFID reader should be larger than a specific threshold value for normal operation. However, since the transmission power of the reader is limited by local regulations of each country, it is not possible to unconditionally raise the level of transmission power. Therefore, the RFID tag should efficiently receive the electromagnetic wave transmitted from the RFID reader to extend the read zone without raising the transmission power level of the reader.

A method for raising the receiving efficiency of the RFID tag is to perform complex conjugate matching of an antenna and a radio frequency (RF) front-end of the RFID tag chip so as to maximize the intensity of the signal received by the RFID tag. In this way, the RFID tag can receive the electromagnetic waves with maximum intensity from the RFID reader.

In designing the RFIF tags, since each antenna should be design to impedance-match with impedance of a corresponding RFID tag chip, a large design time is required.

In addition, the typical RFID tag has a drawback of difficulty in matching with a reactance component of impedance between the RFID antenna and the RFID chip due to the large feed line with the loop shape.

Accordingly, there are difficulties in miniaturizing the RFID tag antenna and reducing cost.

SUMMARY OF THE INVENTION

An exemplary RFID tag according to an embodiment of the present invention is attached to an object and transmits electromagnetic waves that correspond to identification information, and the RFID tag includes an RFID tag chip modulating the electromagnetic waves based on the identification information and an RFID tag antenna transmitting the modulated electromagnetic waves. The RFID tag antenna include: a polyhedral dielectric material having a first surface that contacts the object and a second surface that is parallel with the first surface, a radiating patch formed on at least one part of the second surface and radiating the electromagnetic waves, and at least one slit formed on at least one part of the radiating patch to expose the dielectric material. In addition, the RFID tag antenna may further includes a feed line formed to be connected to the RFID tag chip on the at least one part of an area of the second surface where the radiating patch is not formed, and supplying power to the RFID tag chip through magnetic coupling with the radiating patch.

Impedance of the RFID tag antenna and impedance of the RFID tag chip may be conjugate-matched.

The RFID tag antenna may further includes a shorting unit that controls the magnetic coupling between the feed line and the radiating patch by connecting the feed line and the first surface.

The shorting unit may be formed of a shorting plate that is formed on at least one part of a third surface of the dielectric material and contacts at least one part of the feed line. The third surface of the dielectric material may connect the first surface and the second surface, and the at least part one of the feed line may be at a predetermined distance from the RFID tag chip.

The shorting plate may be formed of a shorting hole that penetrates the at least one part of the feed line and the first surface, and the at least one part of the feed line may be at a predetermined distance from the RFID tag chip.

The dielectric material may correspond to a ceramic material.

An exemplary RFID tag antenna according to another embodiment of the present invention is attached to an object and transmits electromagnetic waves modulated by an RFID tag chip. The RFID tag antenna includes a polyhedral dielectric material having a first surface that contact the object, a second surface that is parallel with the first surface, and a third surface that connects the first and second surfaces, a radiating patch formed on at least one part of the second surface and radiating the modulated electromagnetic waves, a slit formed on at least one part of the radiating patch to expose the dielectric material, and a feed line formed on the at least one part of the second surface and maintaining a first distance from the radiating patch. Here, impedance of the RFID tag antenna and impedance of the RFID tag chip may be conjugate-matched.

The feed line may be connected to at least one part of the RFID tag chip, and may supply power to the RFID tag chip through magnetic coupling with the radiating patch.

The RFID tag antenna may further include a shorting unit that connects the first surface and at least one part of the feed line and control the magnetic coupling of the feed line and the radiating patch, and the at least one part of the feed line may be at a second distance from the RFID tag chip. In this instance, an inductive reactance component of the impedance of the RFID tag antenna may vary in accordance with the second distance.

A resistance component of the impedance of the RFID tag antenna may vary in accordance with the first distance.

A resonance frequency of the RFID tag antenna may vary in accordance of the area of the radiating patch.

A resonance frequency of the RFID tag antenna may vary in accordance with the size of the slit.

The dielectric material may correspond to a ceramic material.

DETAILED DESCRIPTION OF THE EMBODIMENTS

Figure 1:
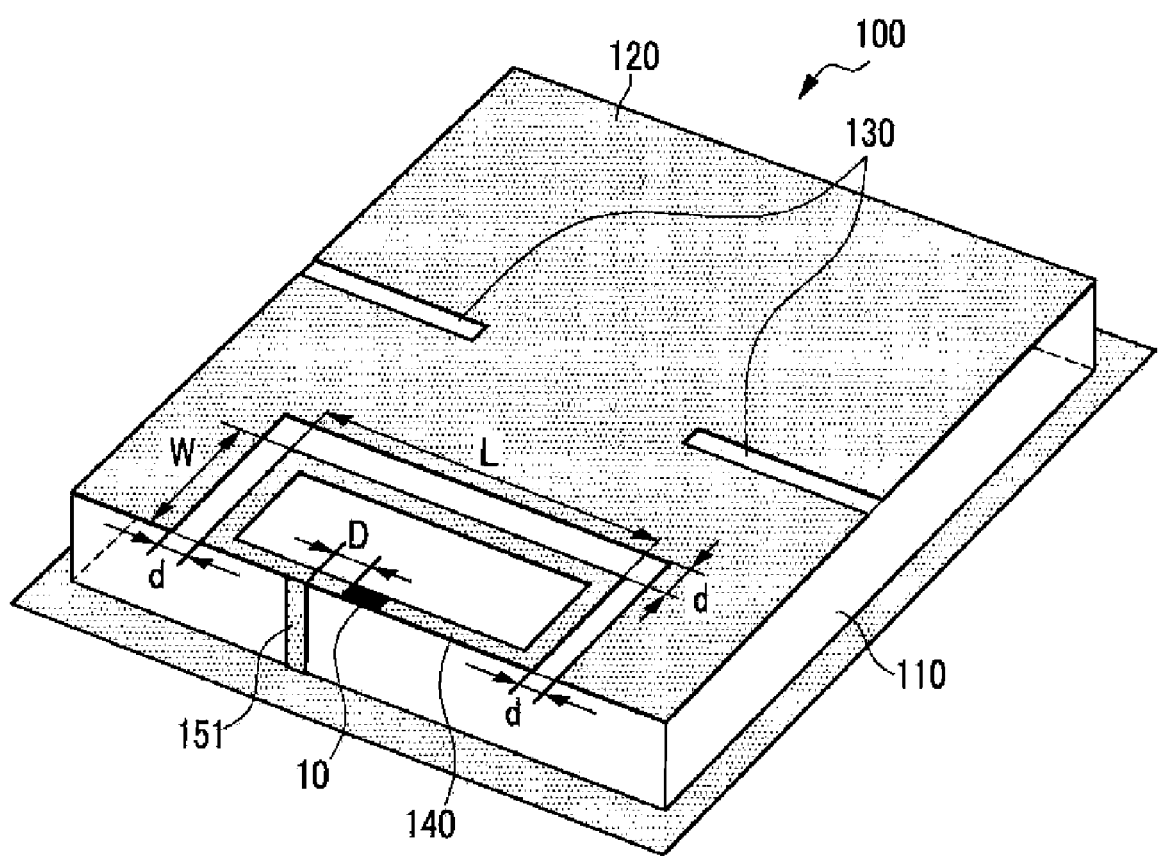
FIG. 1 is a perspective view of a radio frequency identification (RFID) tag according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

A radio frequency identification tag and a radio frequency identification tag antenna according to an exemplary embodiment of the present invention will now be described.

FIG. 1 is a perspective view of a radio frequency identification tag according to a first exemplary embodiment of the present invention.

As shown in FIG. 1, the radio frequency identification (RFID) tag according to the first exemplary embodiment of the present invention includes an RFID tag chip 10 and an RFID tag antenna 100.

The RFID tag chip 10 includes identification information of an object to which the RFID tag is attached, and transmits unique identification information of the object to the RFID reader by modulating the amplitude and/or the phase of the electromagnetic wave received from the RFID reader. The RFID tag chip 10 controls the amount of power by using input impedance so as to modulate the amplitude and/or the phase of the electromagnetic waves, and includes an RF front-end having input impedance.

The RFID tag antenna 100 receives a radio frequency (RF) signal transmitted from the RFID, and scatters the electromagnetic wave modulated by the RFID tag chip 10 for transmission to the RFID reader.

As shown in FIG. 1, according to the first exemplary embodiment, the RFID tag antenna 100 includes a dielectric material 110, a radiating patch 120, a slit 130, a feed line 140, and a shorting plate 151.

The dielectric material 110 has a polyhedral shape, and it has a bottom surface (hereinafter referred to as a ground surface) that contacts the object and an upper surface that is parallel with the bottom surface. The dielectric material 110 may have a cuboid shape, as shown in FIG. 1.

A resonance frequency of the RFID tag antenna 100 varies in accordance with a relative dielectric constant of the dielectric material 110 and the size of the RFID tag antenna 100. That is, the resonance frequency of the RFID tag antenna 100 decreases as the relative dielectric constant of the dielectric material 110 increases or as the size of the RFID tag antenna 100 increases. Also, the resonance frequency of the RFID tag antenna 100 increases as the relative dielectric constant of the dielectric material 110 decreases or the size of the RFID tag antenna 100 decreases. Accordingly, if the dielectric material 110 is made of a ceramic with a high relative dielectric constant, the RFID tag can be realized in a small size while maintaining the resonance frequency.

The radiating patch 120 is formed on at least a part of the upper surface of the dielectric material 110, and it is not connected with the bottom surface of the dielectric material 110. In addition, as shown in FIG. 1, the radiating patch 120 surrounds the feed line 140 while maintaining a predetermined distance d therebetween, and therefore the radiating patch 120 can be magnetically coupled with the feed line 140 with ease.

The slit 130 is a polygonal-shaped groove that is formed at least a part of the radiating patch 120, and partially exposes the dielectric material 110 formed under the radiating patch 120. When the slit 130 is formed in the radiating patch 120, an emission current of the radiating patch 120 flows, avoiding the slit 130, and therefore it has the same effect of increasing the size of the RFID tag antenna 100. Accordingly, the resonance frequency of the RFID tag antenna 100 varies in accordance with the length of the slit 130. Therefore, according to the first exemplary embodiment of the present invention, the resonance frequency of the RFID tag antenna 100 can be controlled by controlling the size of the slit 130 in design of the RFID tag antenna 100.

The feed line 140 is formed on at least a part of the upper surface of the dielectric material 110, while maintaining the predetermined distance d from the radiating patch 120, and has a loop shape having a horizontal length L and a vertical length W.

Here, in design of the RFID tag antenna 100, a resistance component of impedance of the RFID tag antenna 100 can be controlled by controlling the distance d between the radiating patch 120 and the feed line 140. That is, the resistance component of the impedance of the RFID tag antenna 100 changes in accordance with the distance d between the radiating patch 120 and the feed line 140.

In addition, as shown in FIG. 1, the feed line 140 is electrically connected to the RFID tag chip 10, is magnetically coupled with the radiating patch 120, and provides power to the RFID tag chip 10. As described, the magnetic coupling between the radiating patch 120 and the feed line 140 is used as an impedance transformer of the RFID tag antenna 100.

In addition, the RFID tag antenna 100 includes a shorting unit that disconnects the feed line 140 and the ground surface (i.e., the bottom surface) of the dielectric material 110 so that the length of the feed line 140 can be minimized. According to the first exemplary embodiment of the present invention, the shorting unit includes a shorting plate 151.

As shown in FIG. 1, the shorting plate 151 is formed in at least one of sides of the dielectric material 110, and is at least partially connected to the feed line 140. Here, the at least part of the feed line 140 connected to the shorting plate 151 maintains a predetermined distance D from the RFID tag chip 10. That is, the shorting plate 151 is spaced from the RFID tag chip 10 by at least the predetermined distance D to connect to the feeding line 140. In design of the RFID tag antenna 100, a reactance component of impedance of the RFID tag antenna 100 can be controlled by controlling the predetermined distance D between the RFID tag chip 10 and the shorting plate 151. That is, the reactance component of the impedance of the RFID tag antenna 100 changes in accordance with the predetermined distance D between the RFID tag chip 10 and the shorting plate 151.

An RFID tag according to a second exemplary embodiment of the present invention will now be described.

Figure 2:
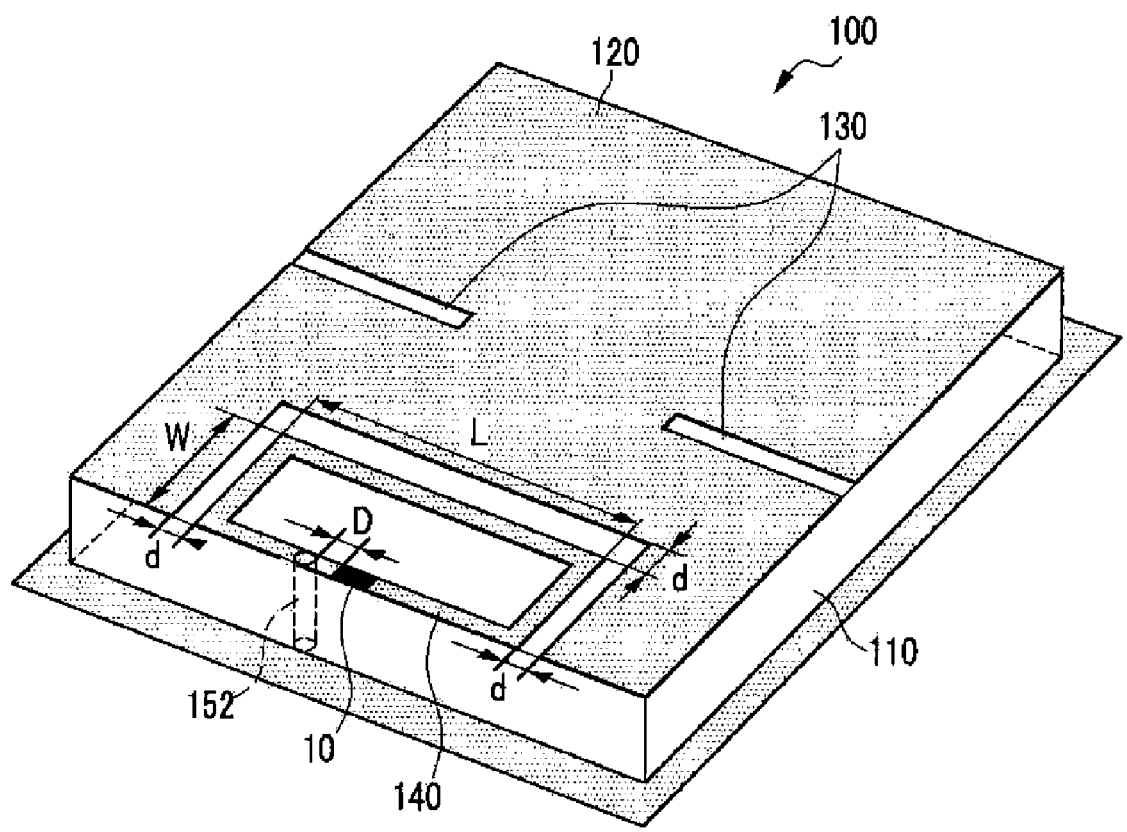
FIG. 2 is a perspective view of an RFID tag according to a second exemplary embodiment of the present invention.

FIG. 2 shows an RFID tag according to the second exemplary embodiment of the present invention.

As shown in FIG. 2, the RFID tag according to the second exemplary embodiment includes an RFID tag chip 10 and an RFID tag antenna 100, and the RFID tag antenna 100 includes a dielectric material 110, a radiating patch 120, a slit 130, a feed line 140, and a shorting hole 152.

As shown in FIG. 2, the RFID tag antenna 100 according to the second exemplary embodiment of the present invention is the same as that of the first exemplary embodiment of the present invention, except that a shorting unit of the RFID tag antenna 100 of the second exemplary embodiment of the present invention includes the shorting hole 152, and therefore descriptions of parts having been described will be omitted. Here, the shorting unit disconnects the feed line 140 and a ground surface (i.e. bottom surface) of the dielectric material 110 so that the length of the feed line 140 can be minimized.

As shown in FIG. 2, the shorting hole 152 penetrates at least a part of the feed line 140 and the ground. At this time, inner surface of the shorting hole 152 may be applied with a material of a radiating patch 120 or the shorting hole 152 may be filled with the material of a radiating patch 120. Here, the at least part of the feed line 140 is at a predetermined distance D from the RFID tag chip 10.

An equivalent circuit of an RF front-end of the RFID tag antenna and the RFID tag chip according to the first and second exemplary embodiments of the present invention will now be described.

Figure 3:
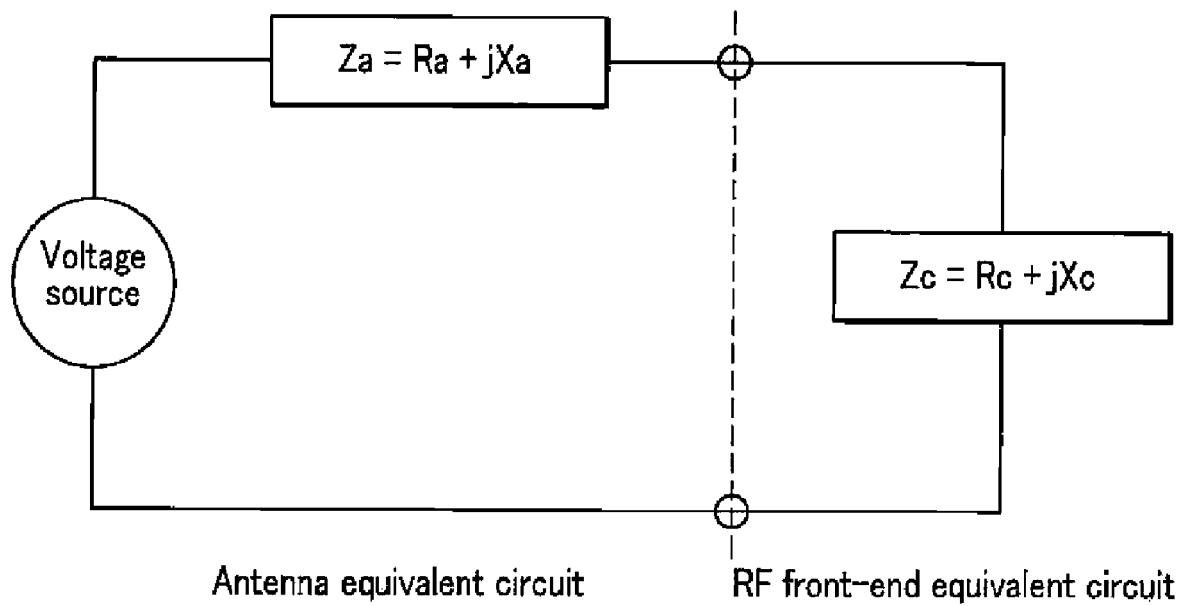
FIG. 3 shows an equivalent circuit of the RFID tag antenna and a radio frequency (RF) front-end according to the exemplary embodiment of the present invention.

FIG. 3 shows an equivalent circuit of the RFID tag antenna and an RF front-end according to the exemplary embodiments of the present invention.

As shown in FIG. 3, the equivalent circuit includes a voltage source, impedance Za of the RFID tag antenna 100, and impedance Zc of the RF front-end. The voltage source and the Impedance Za of the RFID tag antenna 100 is an equivalent circuit of the RFID tag antenna 100, and the impedance Zc of the RF front-end of the RFID tag chip 10 is an equivalent circuit of the RF front-end of the RFID tag chip 10.

A typical value of the impedance Zc of the RF front-end is about 50Ω, but in the present exemplary embodiments, the impedance Zc of the RF front-end has a complex impedance value. That is, the impedance Zc of the RF front-end has a relatively small resistance component Rc and a relatively large capacitive reactance component Xc.

The RFID tag antenna 100 can transmit the maximum power to the RF front-end of a RFID tag chip by conjugate matching the impedance Za of the RFID tag antenna and the impedance Zc of the RF front-end as shown in Equation 1.

$$R_a = R_c$$

$$X_a = -X_c \quad \text{[Equation 1]}$$

In Equation 1, Rc denotes a small resistance component of the impedance Zc of the RF front-end, and Xc denotes a large capacitive reactance component Xc of the RF front-end. As given in Equation 1, the impedance Za of the RFID tag antenna 100 should have a small resistance component Ra and a large inductive reactance component Xa for conjugate-matching of the impedance Za of the RFID tag antenna 100 and the impedance Zc of the RF front-end, and should be resonated at the same resonance frequency as the resonance frequency of the impedance Zc of the RF front-end is resonated.

Therefore, in design of the RFID tag the according to the first and second exemplary embodiments of the present, the impedance Za of the RFID tag antenna 100 is designed to have the large inductive reactance component Xa by controlling the distance D between the shorting units 151 and 152 and the RFID tag chip 10.

In addition, in design of the RFID tag according to the first and second exemplary embodiments of the present invention, the impedance Za of the RFID tag antenna 100 is designed to have the small resistance component Ra by controlling the distance d between the radiating patch 120 and the feed line 140.

In addition, in design of the RFID tag according to first and second exemplary embodiments of the present invention, the RFID tag antenna is designed to be resonated at the resonance frequency of the impedance Zc of the RF front-end by controlling the area of the radiating patch 120 or the size of the slit 130.

The impedance Za of RFID tag antenna, which changes in accordance with the distance D between the shorting units 151 and 152 and the RFID tag chip 10, will now be described.

Figure 4:
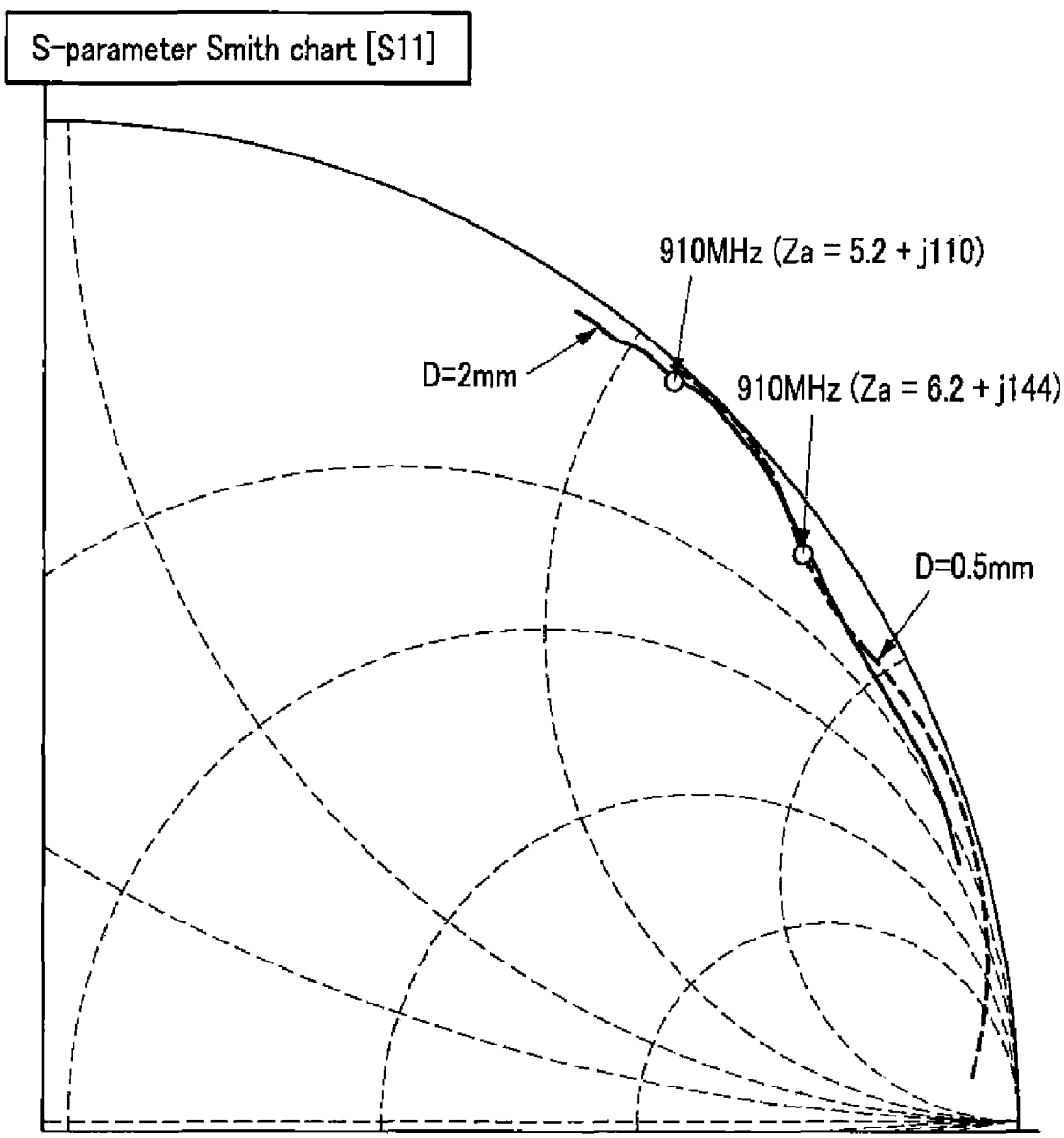
FIG. 4 shows impedance variation with change of a location of a shorting plate according to the exemplary embodiment of the present invention.

FIG. 4 shows impedance variation with change of a location of the shorting unit according to the exemplary embodiment of the present invention. In FIG. 4, the variation of the impedance Za of the RFID tag antenna 100 that corresponds to the change of the distance D between the shorting units 151 and 152 and the RFID tag chip 10 is marked on the Smith chart. For the change of the distance D, the shorting unit that is designed with the shorting plate 151 of the RFID tag according to the first exemplary embodiment is used.

As shown in FIG. 4, in the RFID tag antenna 100 according to the first exemplary embodiment of the present invention, the impedance Za of the RFID tag antenna 100 is (5.2+j110) if the distance D between the shorting plate 151 and the RIFD tag chip 10 is about 2 mm. If the distance D between the shorting plate 151 and the RFID tag chip 10 is about 0.5 mm, the impedance Za of the RFID tag antenna 100 becomes (6.2+j144).

Since the second exemplary embodiment is the same as the first exemplary embodiment except that the shorting unit is designed with the shorting hole, the experimental example of FIG. 4 can be equally applied to the second exemplary embodiment of the present invention.

An operation bandwidth of the RFID tag antenna 100 will now be described on the basis of a return loss between the RFID tag antenna 100 and the RFID tag chip 10.

Figure 5:
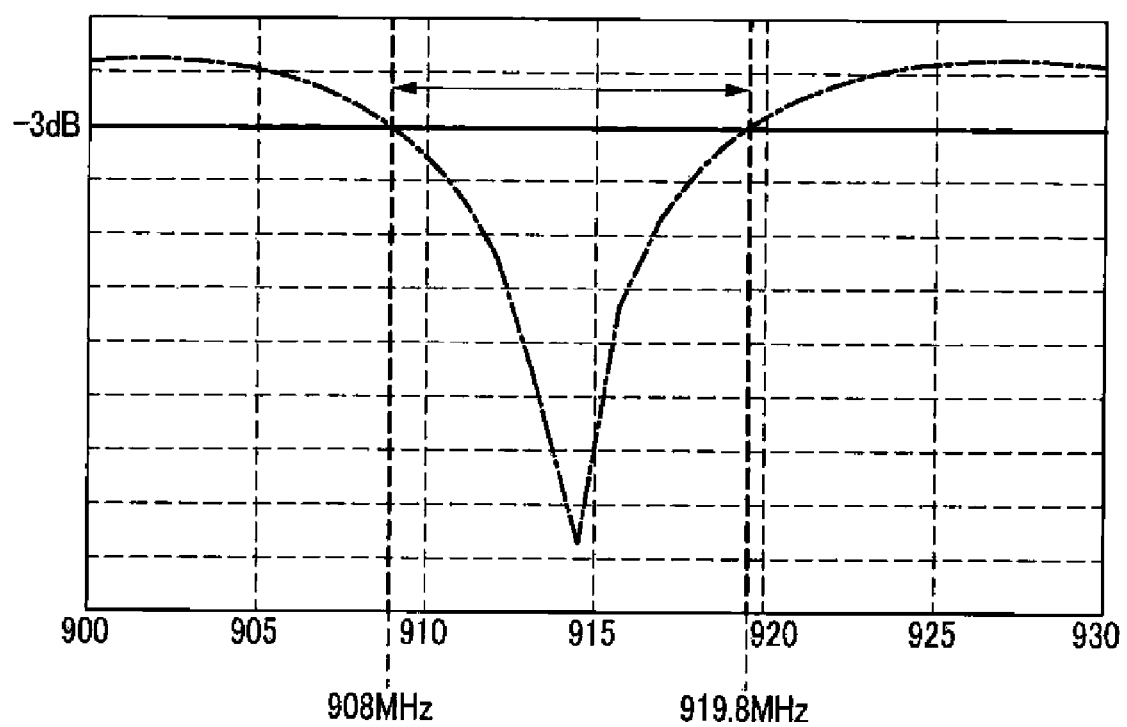
FIG. 5 shows a return loss of the RFID tag according to the exemplary embodiment of the present invention.

FIG. 5 shows a return loss of the RFID tag according to the exemplary embodiment of the present invention. FIG. 5 shows an operation bandwidth of the RFID tag antenna 100 when the volume of the RFID tag antenna 100 is about 25 mm×about 25 mm×about 3 mm and the dielectric material 110 of the RFID tag antenna 100 is made of a ceramic with a relative dielectric constant of about 48.

As shown in FIG. 5, when a reference return loss between the RFID tag antenna 100 and the RFID tag chip 10 is about 3 dB, the operation bandwidth of the RFID tag antenna 100 is about 11.8 MHz.

As described, according to the first exemplary embodiment of the present invention and the second exemplary embodiment, the RFID tag antenna that transmits the electromagnetic waves modulated by the RFID tag chip to the RFID reader can be made of a ceramic dielectric material and can be realized in a small size.

In addition, the impedance Za of the RFID tag antenna 100 can be controlled by controlling the distance between the shorting units 151 and 152 and the RFID tag chip 10 and the distance between the feed line 140 and the radiating patch 120. In addition, the resonance frequency of the RFID tag antenna 100 can be controlled by controlling the area of the radiating patch 120 or the size of the slit 130. Therefore, according to the exemplary embodiments of the present invention, the RFID tag antenna and the RFID tag chip can be efficiently matched.

According to the present invention, the RFID tag antenna controls impedance so that it is efficiently matched with the RFID tag chip. In addition, the RFID tag including the RFID tag antenna that controls the impedance is attached to a metal material and designed to be small in size.

The above-mentioned exemplary embodiments of the present invention are not implemented by only a method and system, but can be implemented by a program implementing functions corresponding to the components of the exemplary embodiments of the present invention or a recoding medium with the program recoded thereon. Those implementations can be easily implemented by those skilled in the art from the descriptions of the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A radio frequency identification (RFID) tag attached to an object, and transmitting electromagnetic waves that correspond to identification information, the RFID tag comprising:
   an RFID tag chip modulating the electromagnetic waves based on the identification information; and
   an RFID tag antenna transmitting the modulated electromagnetic waves,
   wherein the RFID tag antenna comprises
   a polyhedral dielectric material having a first surface that contacts the object and a second surface that is parallel with the first surface,
   a radiating patch formed on at least one part of the second surface and radiating the electromagnetic waves,
   at least one slit formed on at least one part of the radiating patch to expose the dielectric material, and
   a feed line formed to be connected to the RFID to chi on at least one at least one part of an area of the second surface where the radiating patch is not formed, and supplying power to the RFID tag chip through magnetic coupling with the radiating patch, wherein the feed line has a loop shape consisting of at least three sides, and the radiating patch surrounds at least two sides of the loop shape of the feed line.

2. The RFID tag of claim 1, wherein impedance of the RFID tag antenna and impedance of the RFID tag chip are conjugate-matched.

3. The RFID tag of claim 1, wherein the RFID tag antenna further comprises a shorting unit that controls the magnetic coupling between the feed line and the radiating patch by connecting the feed line and the first surface.

4. The RFID tag of claim 3, wherein the shorting unit is formed of a shorting plate that is formed on at least one part of a third surface of the dielectric material and contacts at least one part of the feed line, the third surface of the dielectric material connecting the first surface and the second surface, and the at least one part of the feed line is at a predetermined distance from the RFID tag chip.

5. The RFID tag of claim 3, wherein the shorting unit is formed of a shorting hole that penetrates the at least one part of the feed line and the first surface, and the at least one part of the feed line is at a predetermined distance from the RFID tag chip.

6. The RFID tag of claim 1, wherein the dielectric material corresponds to a ceramic material.

7. A radio frequency identification (RFID) tag antenna attached to an object, and transmitting electromagnetic waves modulated by an RFID tag chip, the RFID tag antenna comprising:
   a polyhedral dielectric material having a first surface that contact the object, a second surface that is parallel with the first surface, and a third surface that connects the first and second surfaces;
   a radiating patch formed on at least one part of the second surface and radiating the modulated electromagnetic waves;
   a slit formed on at least one part of the radiating patch to expose the dielectric material; and
   a feed line formed on the at least one part of the second surface and maintaining a first distance from the radiating patch, wherein the feed line has a loop shape consisting of at least three sides, and the radiating patch surrounds at least two sides of the loop shape of the feed line.

8. The RFID tag antenna of claim 7, wherein impedance of the RFID tag antenna and impedance of the RFID tag chip are conjugate-matched.

9. The RFID tag antenna of claim 8, wherein the feed line is connected to at least one part of the RFID tag chip, and supplies power to the RFID tag chip through magnetic coupling with the radiating patch.

10. The RFID tag antenna of claim 8, further comprising a shorting unit that connects the first surface and at least one part of the feed line and controls the magnetic coupling of the feed line and the radiating patch,
wherein the at least one part of the feed line is at a second distance from the RFID tag chip.

11. The RFID tag antenna of claim 10, wherein an inductive reactance component of the impedance of the RFID tag antenna varies in accordance with the second distance.

12. The RFID tag antenna of claim 8, wherein a resistance component of the impedance of the RFID tag antenna varies in accordance with the first distance.

13. The RFID tag antenna of claim 8, wherein a resonance frequency of the RFID tag antenna varies in accordance of the area of the radiating patch.

14. The RFID tag antenna of claim 8, wherein a resonance frequency of the RFID tag antenna varies in accordance with the size of the slit.

15. The RFID tag antenna of claim 8, wherein the dielectric material corresponds to a ceramic material.

16. The RFID tag of claim 3, wherein the shorting unit is formed in contact with a side of the loop shape of the feed line, the side being not surrounded by the radiating patch.

17. The RFID tag antenna of claim 10, wherein the shorting unit is formed in contact with a side of the loop shape of the feed line, the side being not surrounded by the radiating patch.

* * * * *